(12) United States Patent
Miyashita et al.

(10) Patent No.: US 8,704,778 B2
(45) Date of Patent: Apr. 22, 2014

(54) DISPLAY APPARATUS, DISPLAY METHOD AND PROGRAM

(75) Inventors: Ken Miyashita, Tokyo (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/580,472

(22) Filed: Oct. 16, 2009

(65) Prior Publication Data

US 2010/0097338 A1 Apr. 22, 2010

(30) Foreign Application Priority Data

Oct. 17, 2008 (JP) ................................ P2008-268582

(51) Int. Cl.
*G06F 3/0488* (2013.01)
(52) U.S. Cl.
USPC ......................................... 345/173; 345/174
(58) Field of Classification Search
USPC .................................. 345/173, 174
See application file for complete search history.

(56) References Cited

U.S. PATENT DOCUMENTS

| | | | |
|---|---|---|---|
| 7,209,125 B2 * | 4/2007 | Kong et al. | 345/173 |
| 7,705,833 B2 * | 4/2010 | Kim | 345/173 |
| 2006/0176311 A1 * | 8/2006 | Kimoto et al. | 345/589 |
| 2007/0222769 A1 * | 9/2007 | Otsuka et al. | 345/173 |
| 2008/0165141 A1 * | 7/2008 | Christie | 345/173 |
| 2008/0225014 A1 * | 9/2008 | Kim | 345/173 |

FOREIGN PATENT DOCUMENTS

| | | |
|---|---|---|
| JP | 9-204288 | 8/1997 |
| JP | 2000-163031 | 6/2000 |
| JP | 2003-323258 | 11/2003 |
| JP | 2007-257220 | 10/2007 |

\* cited by examiner

*Primary Examiner* — Claire X Pappas
*Assistant Examiner* — James M Holland
(74) *Attorney, Agent, or Firm* — Sherr & Jiang, PLLC

(57) ABSTRACT

A display apparatus is provided which includes a display control unit which displays predetermined information on a display screen, a position detecting unit which detects a touch position on the display screen touched by a touch substance, and a display splitting unit which, when the position detecting unit detects at least two touch positions, splits the display screen into at least two display areas according to movement of at least one of the at least two touch positions.

20 Claims, 16 Drawing Sheets

DISPLAY APPARATUS, DISPLAY METHOD AND PROGRAM

BACKGROUND OF THE INVENTION

1. Field of the Invention

The present invention relates to a display apparatus, a display method and a program.

2. Description of the Related Art

In recent years, display apparatuses which can display predetermined information on display screens are being actively developed. In these display apparatuses, information is displayed so that users easily view the information, and operability of the display apparatuses is particularly important.

In some cases, when one piece of information is displayed, a display screen is split into a plurality of areas, and the information is displayed on the respective areas. This is called "split of the display screen". In this case, the display apparatus displays GUI (Graphical User Interface) parts such as a knob and a splitter on the display screen. A user who desires to split a display screen operates an input device such as a mouse to select and move a GUI part (for example, drag), so as to split the display screen on a position of the GUI part.

SUMMARY OF THE INVENTION

In the display apparatuses where display screen is split using the GUI parts, it is desirable that the GUI parts are displayed small in order not to prevent display of information. In this case, however, selection and movement of the GUI parts are not easy because they take very minute operations of input devices. Further, in quite a lot of cases, the small GUI parts are not recognized and thus it is difficult to split the display screen.

The present invention has been made in view of the above issue, and it is desirable to provide new and improved display apparatus, display method and program which can easily split a display screen.

According to an embodiment of the present invention, there is provided a display apparatus, including a display control unit which displays predetermined information on a display screen, a position detecting unit which detects a touch position on the display screen touched by a touch substance, and a display splitting unit which, when the position detecting unit detects at least two touch positions, splits the display screen into at least two display areas according to movement of at least one of the at least two touch positions.

According to this constitution, the position detecting unit can detect the touch position between the display screen and the touch substance, and the display splitting unit can split the display screen into at least two display areas according to the movement of at least one of the at least two touch positions. Therefore, a user touches any position on the display screen so as to split the display screen.

Further, the display apparatus may further include a split position determining unit. The split position determining unit determines a position between the at least two touch positions as a position of a border line of the at least two display areas based on the at least two touch positions.

Further, the split position determining unit may determine the position of the border line so that the border line is drawn through a middle point between the at least two touch positions before the movement.

Further, the split position determining unit may determine the position of the border line so that the border line is drawn through a middle point between the at least two touch positions after the movement.

Further, when one of the touch positions is moved, the split position determining unit may determine the position of the border line so that the border line is drawn near the other unmoved touch position.

Further, when after the display splitting unit splits the display screen into the at least two display areas, the position detecting unit detects at least one touch position on the border line of the at least two display areas, the split position determining unit may move the position of the border line so that the border line follows the movement of the at least one touch position.

Further, the display apparatus may further include a split direction determining unit. The split direction determining unit may determine a direction of the border line of the at least two display areas within the display screen according to the at least two touch positions.

Further, the split direction determining unit may determine a direction vertical to a line for connecting the at least two touch positions as the direction of the border line.

Further, the split direction determining unit may determine a direction vertical to the moving direction of at least one of the at least two touch positions as the direction of the border line.

Further, when after the display splitting unit splits the display screen into the at least two display areas, the position detecting unit detects at least two touch positions on the border line of the at least two display areas, the split direction determining unit may rotate the direction of the border line according to the movement of at least one of the at least two touch positions.

Further, when a relative distance between the at least two touch positions becomes short, the display control unit may display an image obtained by enlarging at least a part of the predetermined information on the display screen before the display splitting unit splits the display screen.

Further, when a relative distance between the at least two touch positions becomes long, the display control unit may display an image obtained by contracting at least a part of the predetermined information on the display screen before the display splitting unit splits the display screen.

According to another embodiment of the present invention, there is provided a display method comprising the steps of: controlling display so that predetermined information is displayed on a display screen, detecting a touch position on the display screen touched by a touch substance, and when at least two touch positions are detected at the step of detecting the position, splitting the display screen into at least two display areas according to movement of at least one of the at least two touch positions.

According to another embodiment of the present invention, there is provided a program which allows a computer to realize, a display control function which displays predetermined information on a display screen, a position detecting function which detects a touch position on the display screen touched by a touch substance, and a display splitting function which, when the position detecting function detects at least two touch positions, splits the display screen into at least two display areas according to movement of at least one of the at least two touch positions.

According to the present invention, the display screen can be easily split.

DETAILED DESCRIPTION OF THE EMBODIMENTS

Figure 1:
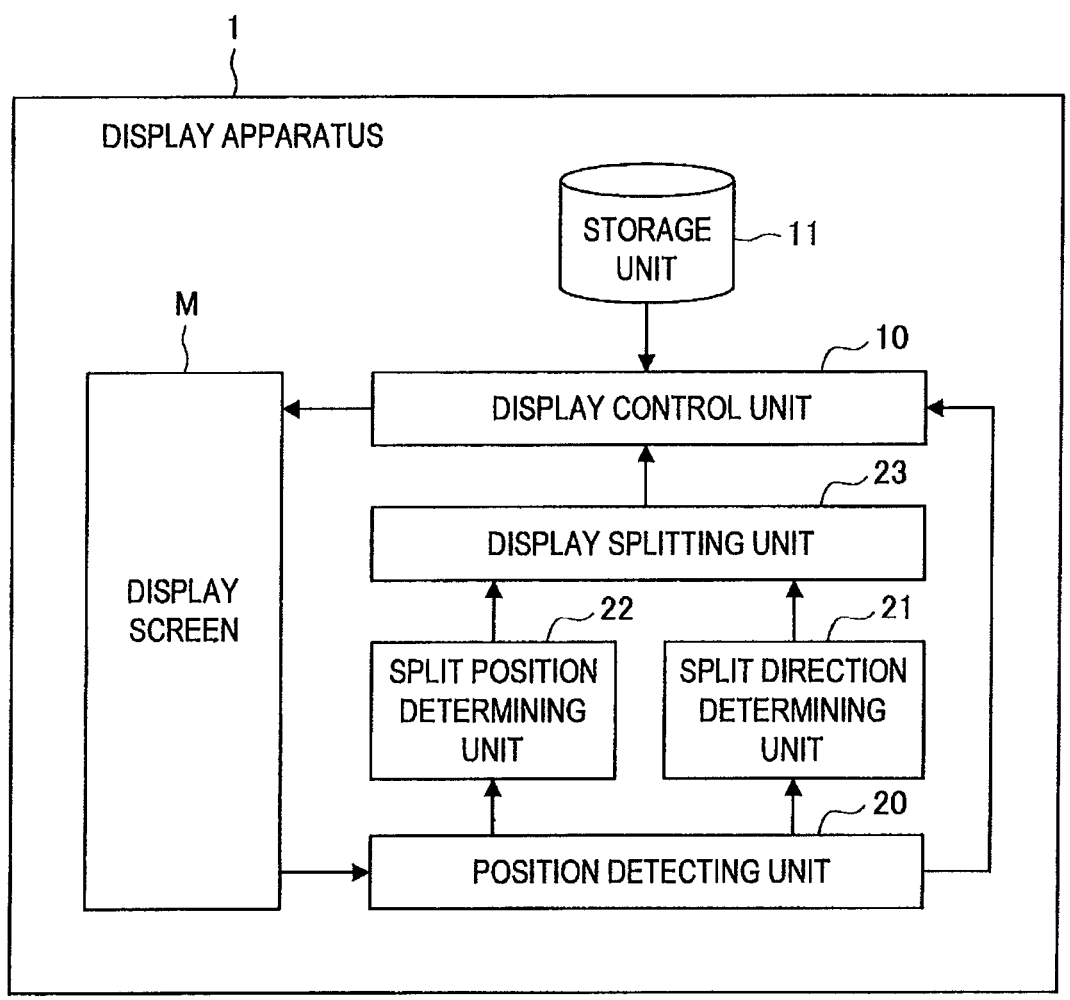
FIG. 1 is an explanatory diagram illustrating a constitution of a display apparatus according to a first embodiment of the present invention.

Hereinafter, preferred embodiments of the present invention will be described in detail with reference to the accompanying drawings. Note that, in this specification and the appended drawings, structural elements that have substantially the same function and structure are denoted with the same reference numerals, and repeated description of these structural elements is omitted.

In a display apparatus according to embodiments of the present invention described below, a user touches two or more touch positions on a display screen to perform a predetermined operation. As a result, the display screen can be split into two or more display areas according to the operation. In order to provide easy understanding of the display apparatus, a case where a user touches two touch positions on the display screen so that the display screen is split into two display areas is described. At this time, a touch substance which touches the display screen may be various touch substances such as a part of a body such as a user's finger and tools such as a touch pen, but a case where the touch substance is a user's finger is described for convenience of the description. It goes without saying that the display apparatus according to the embodiments of the present invention can be applied also to a case of touching on three or more touch positions and a case of another type of touch substances similarly to the embodiments described below.

The display apparatus according to the embodiments of the present invention is described below for easy understanding.
<1. The Display Apparatus in the Related Art>
<2. Outline of the Display Apparatus According to Embodiments of the Present Invention>
<3. First Embodiment>
[3-1. Constitutional Example of the Display Apparatus]
[3-2. Operational Example of the Display Apparatus]
[3-3. Example of Effect of the Display Apparatus]
  <1. The Display Apparatus in the Related Art>
The display apparatus in the related art is described with reference to FIGS. 14A and 14B.

Figure 14A:
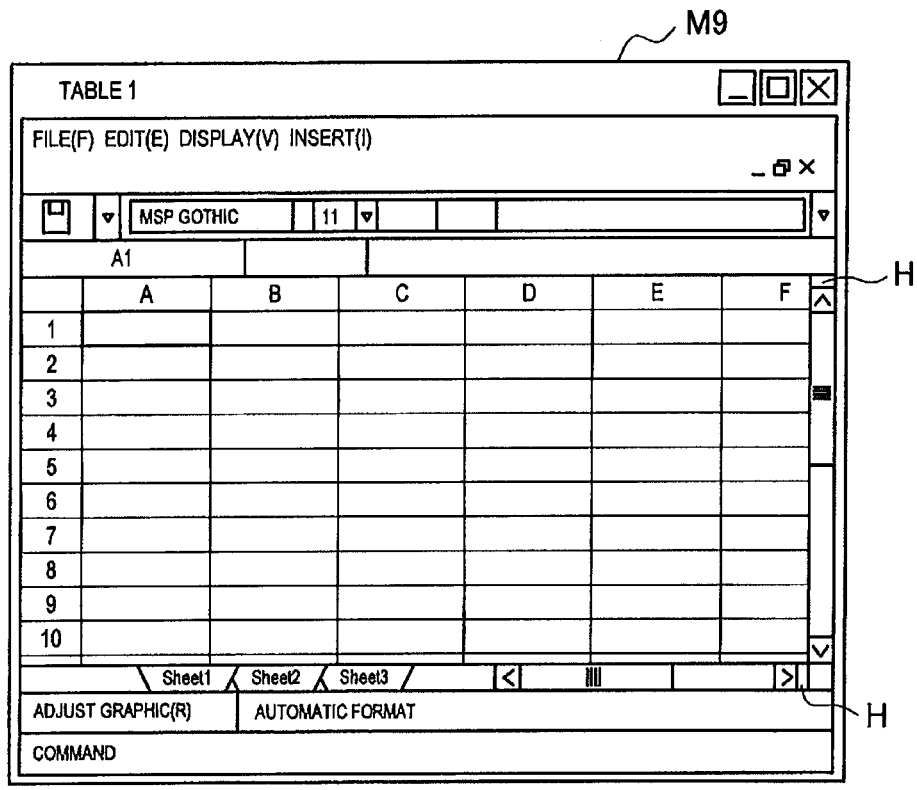
FIG. 14A is an explanatory diagram illustrating an example of the display screen split in the display apparatus in the related art.
Figure 14B:
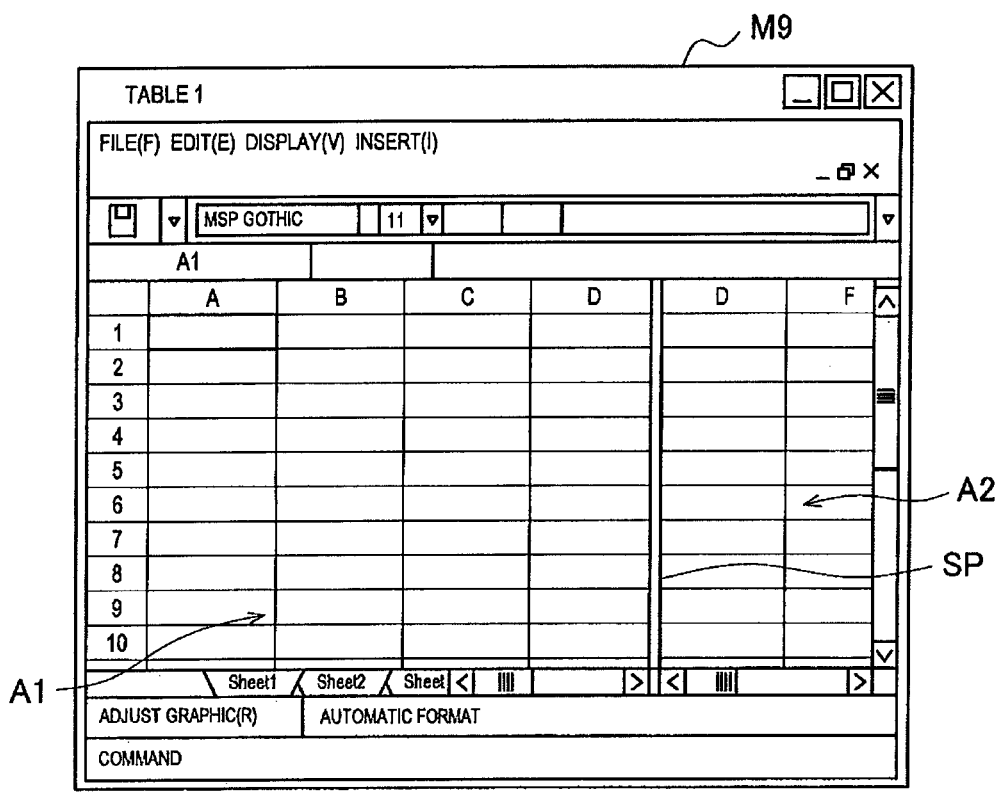
FIG. 14B is an explanatory diagram illustrating an example of the display screen split in the display apparatus in the related art.

FIGS. 14A and 14B are explanatory diagrams illustrating examples of display screen split in the display apparatus in the related art.

FIG. 14A illustrates a state that the display apparatus in the related art displays an image to be used by spreadsheet software on a display screen M9. In the image of the spreadsheet software (one example of information displayed by the display apparatus), a plurality of cells is arranged in row and column directions. In the display apparatus of the related art, a knob H is displayed as a GUI (Graphical User Interface) part for splitting the screen on the image.

When the user who sees this image desires to split the display screen M9 into a plurality of display areas, the knob H is selected and moved by operating an input device such as a mouse. As a result, the display apparatus of the related art displays a splitter SP on a destination to which the knob H is moved as shown in FIG. 14B, and the display screen M9 is split into two display areas A1 and A2 with the splitter SP being a boundary. Thereafter, according to the display apparatus of the related art, information to be displayed on the display areas A1 and A2 can be scrolled independently.

However, as shown in FIG. 14A, in the display apparatus of the related art which splits the display screen using the GUI part, only the GUI part (the knob H) is displayed on the display screen M9 very small. Therefore, in order to select and move the GUI part, the input device such as the mouse should be accurately operated, and thus the splitting of the display screen M9 is not easy. Further, in quite a lot of cases, the user does not notice such a small GUI part, and thus it is difficult to split the display screen M9.

The GUI part is selected by a cursor to be moved by the input device such as the mouse and should be moved to a position where the splitting is desired to be performed. For this reason, in the display apparatus of the related art, it is troublesome to split the display screen on a desired position. Further, it takes a long time to move the GUI part to that position, and thus it is difficult to split the display screen M9 quickly on the desired position.

In the display apparatus of the related art, although the display screen can be split, this splitting operation is not easy, and the quick splitting operation is difficult. Inventors of the present invention can easily arrive at such points to be improved, and devote themselves to conduct the study of operability of the display apparatus and user's operations. As a result, the inventors accomplish the present invention.

<2. Outline of the Display Apparatus according to Embodiments of the Present Invention>

The display apparatus according to the embodiments of the present invention detects touch of a display screen with a user's touch substance (for example, a finger). In the display apparatus, when at least two touch positions are detected without using the GUI parts, the display screen can be split into at least two display areas according to a movement of at least one touch position. That is to say, it is assumed that the user touches the display screen with two fingers. When the user opens or closes the two fingers with them touching the display screen, at least one touch position moves. As a result, the display apparatus according to the embodiments of the present invention can split the display screen into two display areas according to the movement. At this time, the display apparatus according to the embodiments of the present invention can split the display screen into two display areas on positions according to the touch positions with the two fingers.

Therefore, the user simply touches the display screen with two fingers, and moves at least one of the fingers, so that the display screen can be easily split. Further, when the touch positions with the two fingers are set on any positions, the user can split the display screen on any positions quickly.

To move at least one finger so that a relative distance between two fingers is shortened is called "pinch in", and on the contrary to move at least one finger so that the relative distance is lengthened is called "pinch out". To rotate one or both finger(s) about one point with the relative distance between two fingers being kept approximately constant is called "rotate". For example when the display screen is split by the pinching-in operation, the display apparatus according to the embodiments of the present invention can provide operability such that paper (information) displayed on the display screen is contracted by the pinching-in operation to the user. On the other hand, when the display screen is split by the pinching-out operation, the display apparatus according to the embodiments of the present invention can provide operability such that paper (information) displayed on the display screen is ripped by the pinching-out operation to the user.

The display apparatus according to the embodiments of the present invention is not limited to operations and effects described here, and can provide various operations and effects. The display apparatus according to the embodiments of the present invention is described in detail below with reference to FIGS. 1 to 13.

<3. First Embodiment>

The display apparatus according to the first embodiment of the present invention is described below with reference to FIGS. 1 to 11. The first embodiment of the present invention describes a case where the display apparatus has one display screen for convenience of the description, but the number of display screens of the display apparatus is not limited to this example.

[3-1. Constitutional Example of the Display Apparatus]

FIG. 1 is an explanatory diagram illustrating a constitution of the display apparatus according to the first embodiment of the present invention.

As shown in FIG. 1, the display apparatus 1 according to the first embodiment has a display screen M, a display control unit 10, a storage unit 11, a position detecting unit 20, a split direction determining unit 21, a split position determining unit 22 and a display splitting unit 23.

(Display Screen M, Display Control Unit 10 and Storage Unit 11)

The display screen M, the display control unit 10 and the storage unit 11 are first described, and normal information display by means of the display apparatus 1 is described.

The display screen M is one example of the display screen of the display apparatus 1, and the display control unit 10 controls information (predetermined information) to be displayed on the display screen M, its display state, display magnification and display format.

Figure 2:
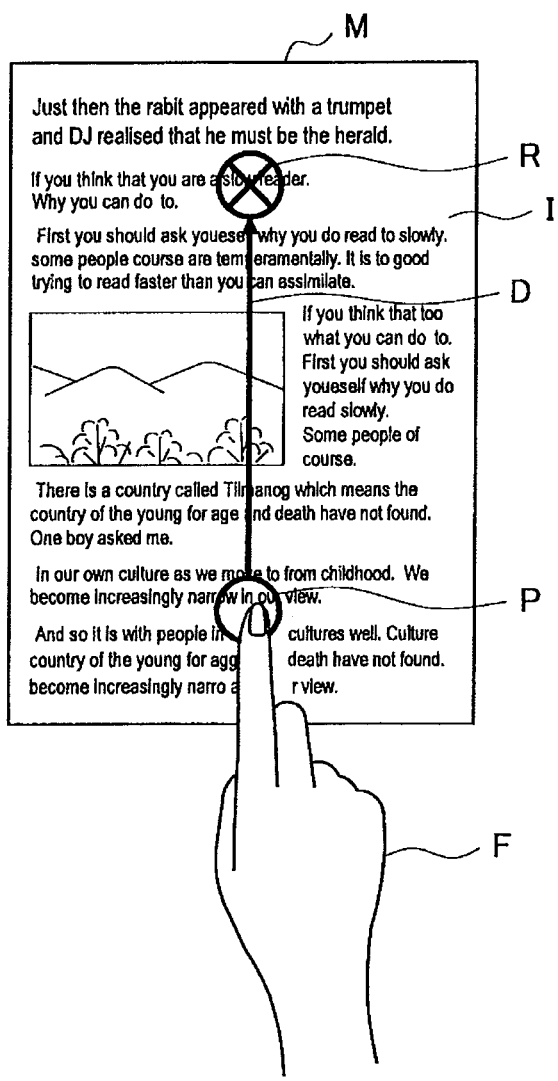
FIG. 2 is an explanatory diagram illustrating one example of a display image displayed on a display screen by the display apparatus according to the first embodiment.

In the first embodiment, as shown in FIG. 2, the display control unit 10 displays the information recorded in the storage unit 11 on the display screen M. However, the information to be displayed by the display control unit 10 is not only the information recorded in the storage unit 11 but also may be external or internal information acquired by a separated information acquiring unit (not shown), or information on a network. Further, the information to be displayed by the display control unit 10 may include various information such as contents on Web, maps, photographs, text data, spreadsheet data, writing data, and illustration data. That is to say, the type of the information to be displayed on the display screen M is not particularly limited as long as the information can be displayed.

The display screen M may be various display screens such as Cathode Ray Tube (CRT), a Liquid Crystal Display (LCD), a Plasma Display Panel (PDP), a Field Emission Display (FED), or an Organic Electroluminescence Display (Organic EL, OELD), and a video projector. That is to say, also the type of the display screen M is not limited.

(Position Detecting Unit 20)

The position detecting unit 20 detects a touch position of the display screen M touched by a touch substance (for example, a user's finger). More concretely, the position detecting unit 20 has a touch sensor which is arranged on a front face of the display screen M in order to detect the touch position of the display screen M touched by the user's finger (one example of the touch substance). Examples of the touch sensor are a touch sensor, a touch panel, a touch screen and a touch pad having a matrix switch, a resistive switch, a surface acoustic wave switch. It goes without saying that various apparatuses can be used as the touch sensor as long as they can detect a touch position of the display screen M with a touch substance.

The position detecting unit 20 can detect a movement of the touch position. As shown in FIG. 2, it is assumed that a user's finger F touches a touch position P of the display screen M. In this case, the position detecting unit 20 detects not only the touch with the finger F but also the touch position P. It is assumed that the user moves the finger F to a moving direction D with the finger F touching the display screen M. At this time, the position detecting unit 20 detects also the movement of the touch position P (the moving direction D and its distance). In FIG. 2, a symbol (o) of the touch position P typically shows a touch starting position, and a symbol (arrow) of the moving direction D typically shows a trajectory (direction and distance) at the time when the touch substance in touch state moves. A symbol (a combination of o and x) of a separation position R typically shows that the touch substance disengages the touch and is separated from the display screen M. In FIGS. 3A to 10B, similar symbols are used as to the touch position and the like.

The position detecting unit 20 can detect two or more touch positions. That is to say, when the user touches the display screen M with two fingers, the position detecting unit 20 can detect the respective touch positions. The position detecting unit 20 can detect also movements of the two or more detected touch positions. At this time, the position detecting unit 20 detects the movements of the two or more touch positions and/or detects a distance between the touch positions.

(Split Direction Determining Unit 21)

The split direction determining unit 21 determines a direction of a border line at the time of splitting the display screen M into at least two display areas within the display screen M according to the at least two touch positions detected by the position detecting unit 20. As described above, the display apparatus 1 according to the first embodiment can split the display screen M into a plurality of display areas according to the movement of at least one of the at least two touch positions. The split direction determining unit 21 can determine the direction of the border line between the display areas.

At this time, the split direction determining unit 21 can determine the direction using various methods according to the at least two touch positions. Examples of the split direction determining method are described below. The examples here are only examples, and it goes without saying that various modified examples are considered.

(Direction Determining Method 1) The method for determining any one of a plurality of predetermined directions as the direction of the border line according to a relative relationship between the at least two touch positions.

(Direction Determining Method 2) The method for determining a direction vertical to a line connecting both the at least two touch positions as the direction of the border line according to the relative relationship between the at least two touch positions.

(Direction Determining Method 3) The method for determining a direction vertical to a moving direction of at least one touch position as the direction of the border line according to the moving direction.

(Direction Determining Method 1)

Figure 3A:
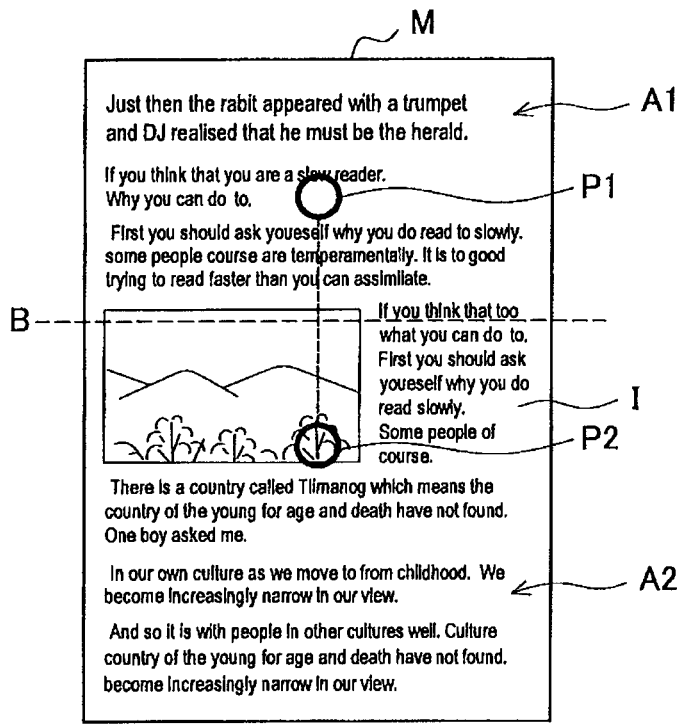
FIG. 3A is an explanatory diagram illustrating a determination example of a direction of a border line at the time of display screen split in the display apparatus according to the first embodiment.

An operation of the split direction determining unit 21 in the case where any one of a plurality of predetermined directions is determined as the direction of the border line is described with reference to FIG. 3A. It is assumed that an up-down direction and a right-left direction are predetermined as the direction of the border line B. In this case, as shown in FIG. 3A, it is assumed that the position detecting unit 20 detects two touch positions P1 and P2. As a result, the split direction determining unit 21 selects one direction from the plurality of predetermined directions as the direction of the border line B based on the relative relationship between the two touch positions P1 and P2. The case of FIG. 3A is described more concretely. In the case of FIG. 3A, the touch positions P1 and P2 are separated from each other in the up-down direction. In this case, the split direction determining unit 21 desirably determines any one of the plurality of predetermined directions (In FIG. 3A, the right-left direction) as the direction of the border line B so that the touch positions P1 and P2 separated in the up-down direction belong to the different display areas A1 and A2. On the contrary, when the touch positions P1 and P2 are separated in the right-left direction, the split direction determining unit 21 can determine the up-down direction as the direction of the border line B. In this example, when the touch positions P1 and P2 are separated in an oblique direction, the split direction determining unit 21 determines that the oblique direction is close to the up-down direction and the right-left direction, and can determine the direction according to the result as the direction of the border line B.

In the direction determining method 1, the display apparatus 1 can determine one of the plurality of predetermined directions as the direction of the border line. Therefore, the display apparatus 1 can split the display screen M in a user's desired direction. The other direction determining methods 2 and 3 described below can further heighten selectivity of a direction by a user and further improve user's convenience with respect to the direction determining method 1. The direction determining methods 2 and 3 are described in detail below.

(Direction Determining Method 2)

Figure 3B:
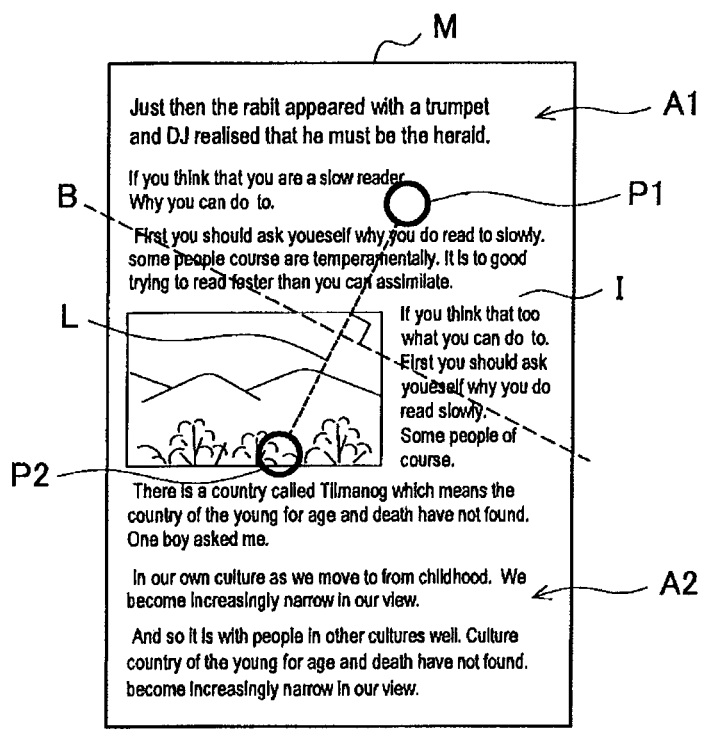
FIG. 3B is an explanatory diagram illustrating a determination example of a direction of a border line at the time of display screen split in the display apparatus according to the first embodiment.

An operation of the split direction determining unit 21 in the case where the direction vertical to the line connecting the at least two touch positions is determined as the direction of the border line is described with reference to FIG. 3B. As shown in FIG. 3B, it is assumed that the position detecting unit 20 detects the two touch positions P1 and P2. As a result, as shown in FIG. 3B, the split direction determining unit 21 connects the touch positions P1 and P2 using a line L and determines a direction vertical to the line L within the display screen M as the direction of the border line B.

In the direction determining method 2, differently from the direction determining method 1, the user sets the touch positions P1 and P2 with a desired positional relationship, so as to determine a desired direction as the direction of the border line B. Therefore, the display apparatus 1 can split the display screen M into the plurality of display areas A1 and A2 using various directions as the direction of the border line B within the display screen M.

(Direction Determining Method 3)

Figure 3C:
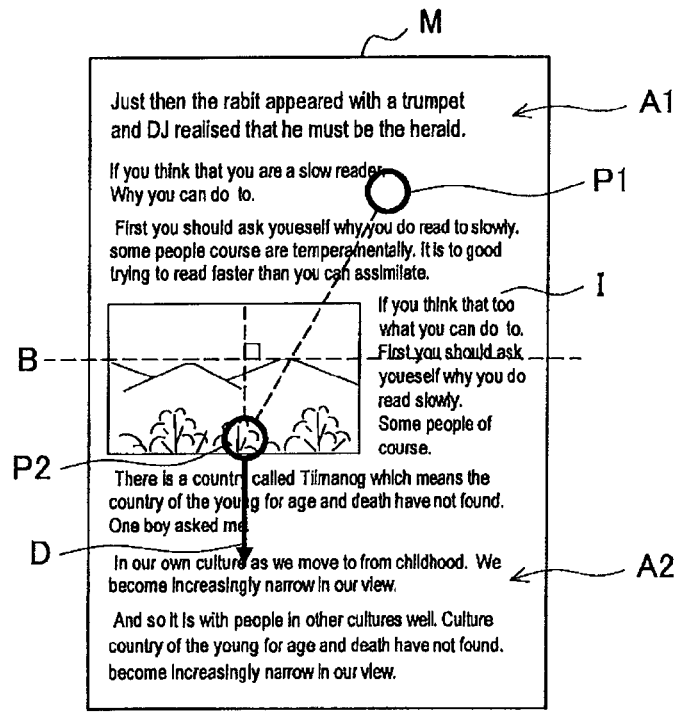
FIG. 3C is an explanatory diagram illustrating a determination example of a direction of a border line at the time of display screen split in the display apparatus according to the first embodiment.
Figure 3D:
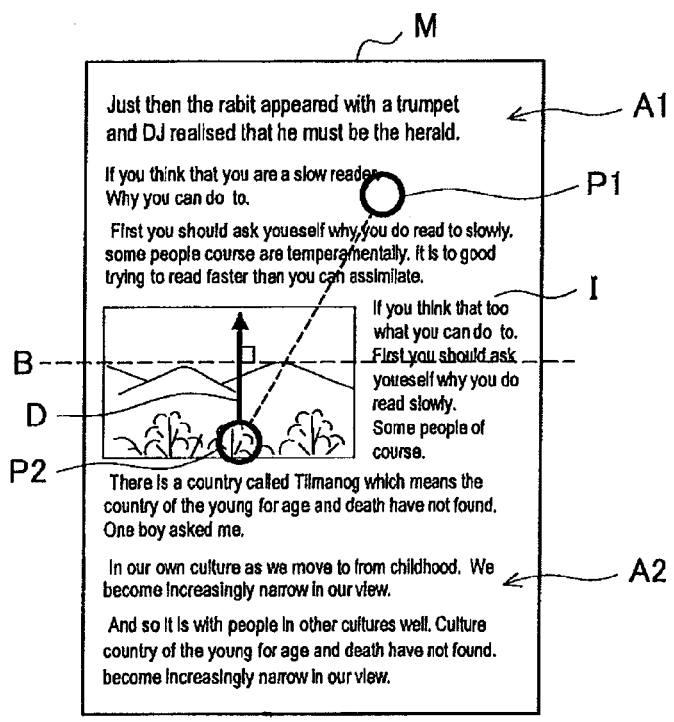
FIG. 3D is an explanatory diagram illustrating a determination example of a direction of a border line at the time of display screen split in the display apparatus according to the first embodiment.

An operation of the split direction determining unit 21 in the case where the direction vertical to the moving direction of at least one touch position is determined as the direction of the border line is described with reference to FIGS. 3C and 3D. As shown in FIG. 3C, it is assumed that the position detecting unit 20 detects the two touch positions P1 and P2, and then the touch positions P1 and P2 are pinched out so that the touch position P2 is moved to a moving direction D where it separates from the touch position P1. As a result, the split direction determining unit 21 can determine the direction vertical to the moving direction D of the touch position P2 as the direction of the border line B as shown in FIG. 3C.

On the other hand, it is assumed that the touch positions P1 and P2 are pinched in and the touch position P2 moves to the moving direction D where it gets close to the touch position P1. Also in this case, the split direction determining unit 21 can determine the direction vertical to the moving direction D of the touch position P2 as the direction of the border line B as shown in FIG. 3D.

In the direction determining method 3, similarly to the direction determining method 2, the user sets a desired direction as the moving direction D of the touch position P1 or P2 so as to determine the desired direction as the direction of the border line B. The display apparatus 1, therefore, can split the display screen M into the plurality of display areas A1 and A2 using various directions within the display screen M as the direction of the border line B.

It is desirable that the direction determining method 1, 2 or 3 or any one of their modified examples is preset as the direction determining method to be used when the split direction determining unit 21 determines the direction of the border line B. The split direction determining unit 21 can suitably change the direction determining method according to the touch positions P1 and P2.

After the display screen M is split into the two or more display areas A1 and A2, the split direction determining unit 21 can change the direction of the border line B. The change in the direction is described in detail in the description of the display splitting unit 23.

Further, when the direction of the border line at the time of splitting the display screen M is predetermined, the split direction determining unit 21 does not have to be provided. When the split direction determining unit 21 which can determine the direction of the border line according to at least the two touch positions is provided, the display apparatus 1 can split the display screen M along a user's desired direction as the border line. Therefore, for example, when map data is displayed or image data is present in a part of text data, the display screen M is split in any direction so that the display screen M can be split into user's desired areas. As a result, the user's convenience can be further improved.

(Split Position Determining Unit 22)

The split position determining unit 22 determines a position of the border line at the time of splitting the display screen M into at least two display areas between at least two touch positions based on at least the two touch positions detected by the position detecting unit 20. The split direction determining unit 21 determines the direction of the border line B, but the split position determining unit 22 can determine the position of the border line B.

At this time, the split position determining unit 22 can determine the position in various methods based on at least the two touch positions. Examples of the split position determining methods are described below. It goes without saying that the examples here are only examples similarly to the examples of the direction determining methods, and various modified examples can be considered.

(Position Determining Method 1) The method for determining any one of the plurality of predetermined positions as the position of the border line according to a relative relationship between the at least two touch positions.

(Position Determining Method 2) The method for determining the position of the border line so that the border line is drawn through a middle point of the at least two touch positions before the movement.

(Position Determining Method 3) The method for determining the position of the border line so that the border line is drawn though a middle point between the at least two touch positions after the movement.

(Position Determining Method 4) The method for determining the position of the border line so that the border line is drawn near the unmoved touch position when one touch position is moved.

(Position Determining Method 1)

Figure 4A:
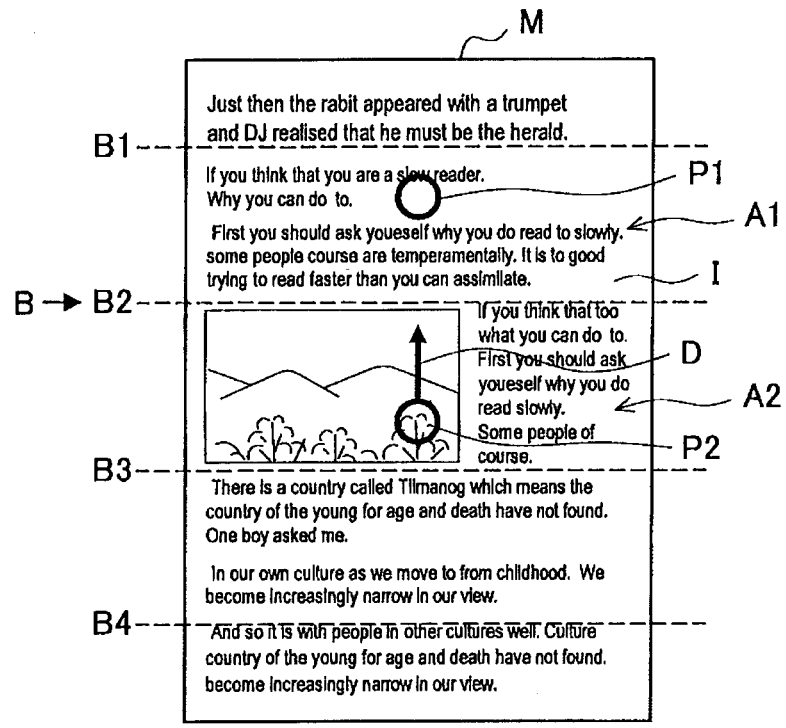
FIG. 4A is an explanatory diagram illustrating a determination example of a position of the border line at the time of the display screen split in the display apparatus according to the first embodiment.

An operation of the split position determining unit 22 for determining any one of the plurality of the predetermined positions as the position of the border line B according to a relative relationship between the at least two touch positions when the plurality of positions of the border line is predetermined is described with reference to FIG. 4A. As shown in FIG. 4A, a plurality of positions of the border lines B is predetermined in the direction determined by the split direction determining unit 21, and lines which are drawn through these positions are shown as border lines B1 to B4 in FIG. 4A. In this case, as shown in FIG. 4A, the split position determining unit 22 determines one position from the plurality of preset positions as the position of the border line B so that the at least two touch positions P1 and P2 are included in the different display areas A1 and A2, respectively. That is to say, in the example of FIG. 4A, the split direction determining unit 21 sets the border line B2 from the candidate border lines B1 to B4 as the border line B between the display areas A1 and A2.

In the position determining method 1, the display apparatus 1 can determine one position from the plurality of preset positions (border lines B1 to B4) as the position of the border line B. The display apparatus 1, therefore, can split the display screen M on a user's desired position. In the other position determining methods 2 to 4 described below, selectivity of the position by a user can be further heightened, and the user's convenience can be further improved with respect to the position determining method 1. The position determining methods 2 to 4 are described in detail below.

(Position Determining Method 2)

An operation of the split position determining unit 22 for determining the position of the border line so that the border line is drawn through the middle point of the at least two touch positions before the movement is described with reference to FIG. 4B. In this case, the pinching-out operation is performed. It goes without saying that also when the pinching-in operation is performed, the split position determining unit 22 can perform the similar operation.

Figure 4B:
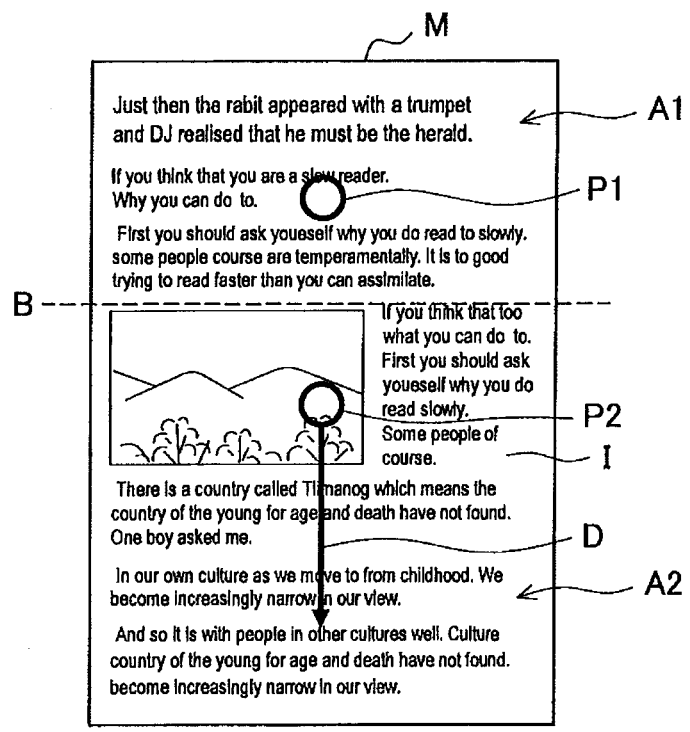
FIG. 4B is an explanatory diagram illustrating a determination example of a position of the border line at the time of the display screen split in the display apparatus according to the first embodiment.

As shown in FIG. 4B, it is assumed that the position detecting unit 20 detects the touch positions P1 and P2, and then the pinching-out operation is performed, and the touch position P2 is separated from the touch position P1. In this case, in the position determining method 2, the split position determining unit 22 can determine the border line B so that the border line B is drawn through the middle point between the touch positions P1 and P2 before the movement of the touch position P2 as shown in FIG. 4B.

In the position determining method 2, differently from the position determining method 1, a user sets the touch positions P1 and P2 with a desired positional relationship, so as to determine a desired position as the position of the border line B. The display apparatus 1, therefore, can split the display screen M into the plurality of display areas A1 and A2 using various positions as the position of the border line B within the display screen M.

(Position Determining Method 3)

An operation of the split position determining unit 22 for determining the position of the border line so that the border line is drawn through the middle point between the at least two touch positions after the movement is described with reference to FIG. 4C. In this case, the pinching-in operation is performed. It goes without saying that also when the pinching-out operation is performed, the split position determining unit 22 performs the similar operation.

Figure 4C:
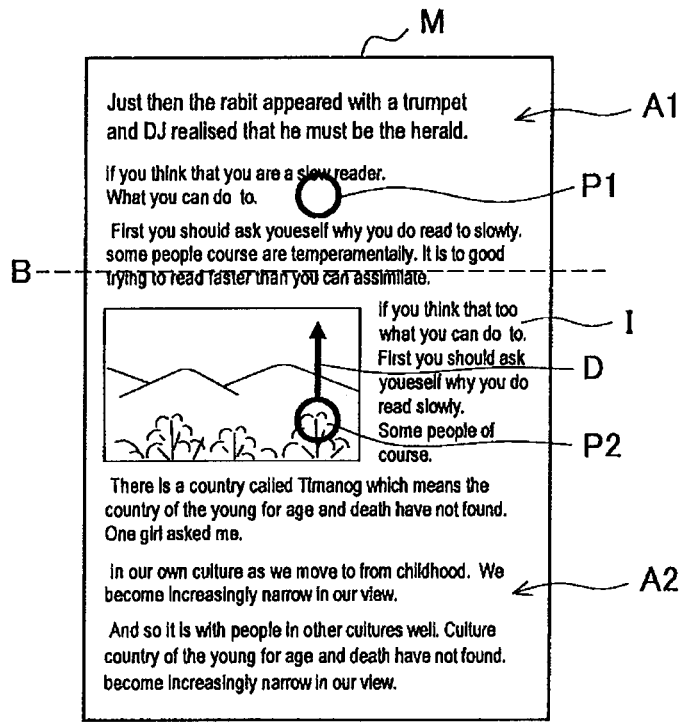
FIG. 4C is an explanatory diagram illustrating a determination example of a position of the border line at the time of the display screen split in the display apparatus according to the first embodiment.

As shown in FIG. 4C, it is assumed that the position detecting unit 20 detects the touch positions P1 and P2, and then the pinching-in operation is performed so that the touch position P2 gets close to the touch position P1. In this case, in the position determining method 3, as shown in FIG. 4C, the split position determining unit 22 can determine the border line B so that the border line B is drawn through the middle point between the touch positions P1 and P2 after the movement of the touch position P2.

In the position determining method 3, the user sets a moving destination of the touch position P2 to be moved and the touch position P1 with a desired positional relationship, so as to determine a desired position as the position of the border line B. The display apparatus 1, therefore, can split the display screen M into the plurality of display areas A1 and A2 using various positions as the position of the border line B within the display screen M.

(Position Determining Method 4)

An operation of the split position determining unit 22 for determining the position of the border line so that the border line is drawn near the unmoved touch position when one touch position is moved is described with reference to FIG. 4D. In this case, the pinching-out operation is performed. It goes without saying that also when the pinching-in operation is performed, the split position determining unit 22 can perform the similar operation.

Figure 4D:
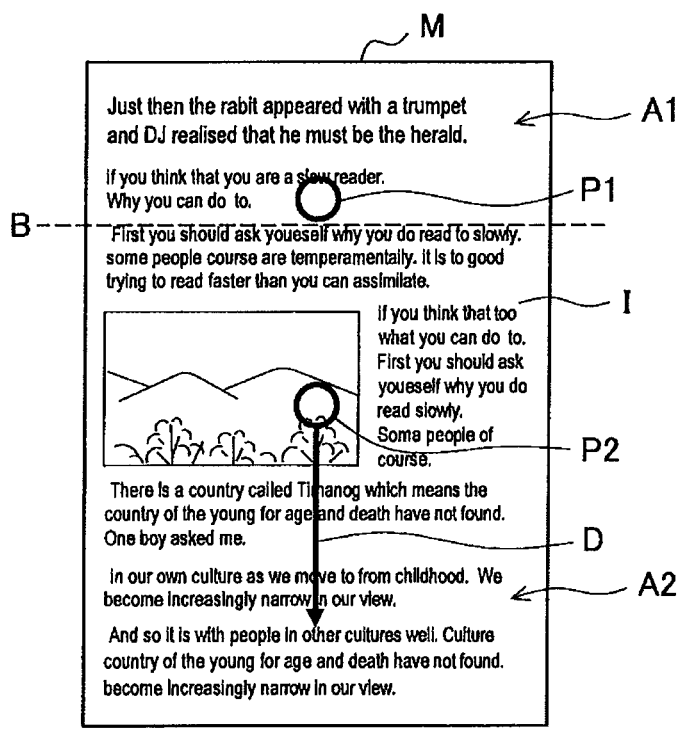
FIG. 4D is an explanatory diagram illustrating a determination example of a position of the border line at the time of the display screen split in the display apparatus according to the first embodiment.

As shown in FIG. 4D, it is assumed that the position detecting unit 20 detects the touch positions P1 and P2, and then the pinching-out operation is performed, so that the touch position P2 is separated from the touch position P1. In this case, in the position determining method 4, the split position determining unit 22 can determine the border line B so that the border line B is drawn though a point near the unmoved touch position P1 as shown in FIG. 4D. More concretely, it is desirable that the split position determining unit 22 determines the position of the border line B so that the border line B is drawn near the unmoved touch position P1 and between the touch positions P1 and P2.

In the position determining method 4, the user sets the unmoved touch position P1 on a desired position, so as to determine the desired position as the position of the border line B. The display apparatus 1, therefore, can split the display screen M into the plurality of display areas A1 and A2 using various positions as the position of the border line B within the display screen M. In the position determining method 4, a display image I is pinned by a touch substance (for example, finger) which touches the unmoved touch position P1, and the display image I is ripped or contracted so as to be split according to the movement of the other touch position P2. In the position determining method 4, therefore, completely new operability can be provided to users.

As the position determining method to be used for determining the position of the border line B by the split direction determining unit 21, any one of the position determining methods 1 to 4 or their modified examples may be preset. However, the method can be suitably selected from the position determining methods 1 to 4 according to the touch positions P1 and P2, the moving direction D or the split direction. For example, when at least one touch position P1 does not move, the position determining method 4 may be used. For example, when all the touch positions P1 and P2 move and are pinched out, the position determining method 2 is used, and when they are pinched in, the position determining method 3 may be used. If the split direction determining unit 21 determines the up-down direction as the direction of the border line B, the position determining method 1 is used. Such combinations can be provided. It goes without saying that the combinations of the position determining methods here are only examples, and various modified examples can be considered. However, such combinations can reflect a user's purpose such that the split is desired to be performed with contents already displayed on the display screen M being maintained more than enough.

After the display screen M is split into the two or more display areas A1 and A1, the split position determining unit 22 can change the position of the border line B. Such a change in the position is described in detail in the description of the display splitting unit 23.

Further, when the position of the border line B at the time of splitting the display screen M is predetermined, the split position determining unit 22 does not have to be provided. When the split position determining unit 22 which can determine the direction of the border line B based on the at least two touch positions is provided, the display apparatus 1 can split the display screen M on a user' desired position as the border line. Therefore, when map data is displayed or text data partially include image data, the display screen M is split on any position, so that the display screen M can be split into user's desired areas. As a result, the user's convenience can be further improved.

(Display Splitting Unit 23)

When the position detecting unit 20 detects at least two touch positions, the display splitting unit 23 splits the display screen M into at least two display areas A1 and A2 according to the movement of at least one of the at least two touch positions. In other words, when the distance between the detected touch positions changes, the display splitting unit 23 splits the display screen M. At this time, the display splitting unit 23 splits the display screen M into the plurality of display areas A1 and A2 along the border line B on the position determined by the split position determining unit 22 in the direction determined by the split direction determining unit 21.

Figure 5A:
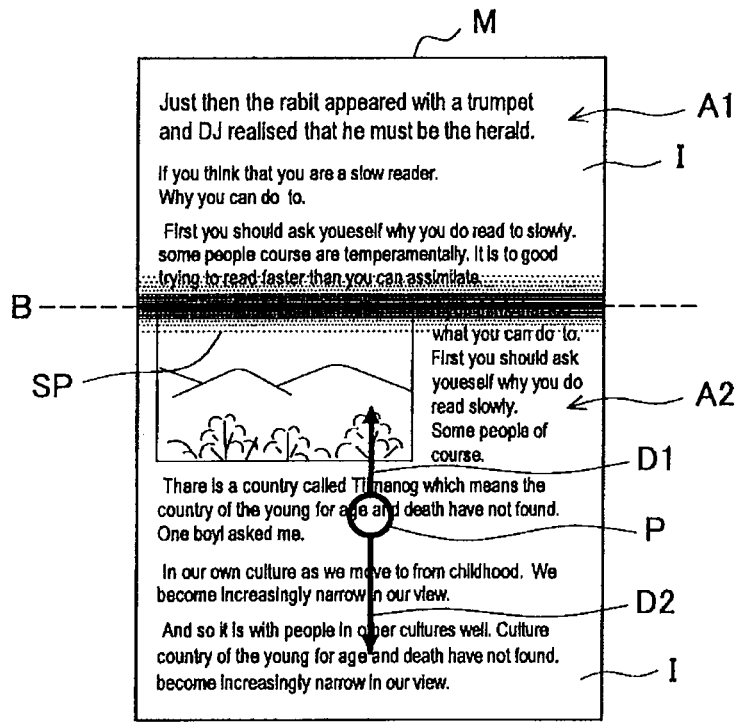
FIG. 5A is an explanatory diagram illustrating one example of a display image after the display screen split in the display apparatus according to the first embodiment.
Figure 5B:
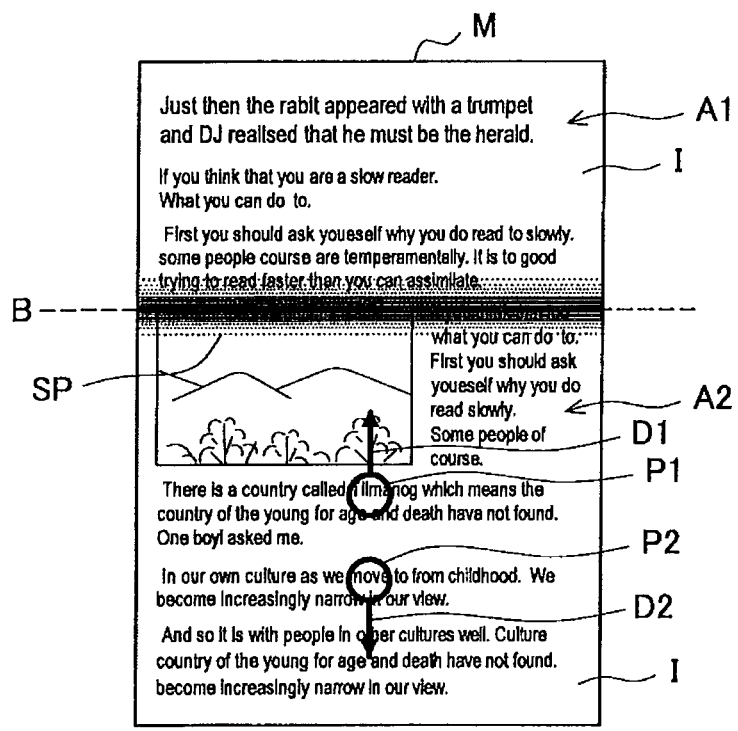
FIG. 5B is an explanatory diagram illustrating one example of a display image after the display screen split in the display apparatus according to the first embodiment.

FIGS. 5A and 5B illustrate examples of the display images I displayed on the display screen M after the split. As shown in FIGS. 5A and 5B, when the display splitting unit 23 splits the display screen M into the plurality of display areas A1 and A2, the display control unit 10 displays a splitter SP representing the split state of the display screen M on the border line B of the split. The display control unit 10 displays the display image I (namely, predetermined information) on the display area A1 and A2 after the split so as to be capable of being scrolled or enlarged or contracted independently. That is to say, as shown in FIG. 5A, when the touch position P is detected on the display area A2 after the split, and the touch position P moves, the display control unit 10 can slide the display image I on the display area A2 so that the display image I follows the movement of the touch position P. On the other hand, as shown in FIG. 5B, when the two touch positions P1 and P2 are detected on the display area A2 after the split and the pinching-in or pinching-out operation is performed, the display control unit 10 can contract or enlarge the display image I on the display area A2 according to the operation. As a result, the display apparatus 1 can improve the user's convenience such that the user looks around while viewing the periphery of a destination when a map is displayed, the user slides only a text while viewing the text including graphics, or the user slides only a graph while viewing the legends.

The split of the display screen M is desirably performed at predetermined timing. That is to say, the following examples are present as the timing at which the display splitting unit 23 splits the display screen M into the plurality of display areas A1 and A2. It goes without saying that the examples here are only examples similarly to the examples of the direction determining method, and various modified examples are considered.

(Split Timing 1) The timing at which a change amount of the relative distance between the at least two touch positions exceeds a predetermined threshold.

(Split Timing 2) The timing at which a moving amount of the moving touch position exceeds a predetermined threshold.

(Split Timing 3) The timing at which at least one of the at least two touch positions is separated from the display screen M.

At the split timing 1, when the change amount of the relative distance between the two touch positions P1 and P2 exceeds a predetermined threshold, the display splitting unit 23 splits the display screen M. That is to say, when the touch positions P1 and P2 get close to each other so as to reach a predetermined distance and are separated from each other, the display screen M is split. The predetermined threshold at the split timing 1 may be determined according to constant percentage of the distance between the touch positions P1 and P2 before the movement. Instead of the case where the change amount of the distance exceeds the threshold, when the distance exceeds a predetermined range, the display screen M may be split.

At the split timing 2, when a moving distance of at least one of the two touch positions P1 and P2 exceeds a predetermined threshold, the display splitting unit 23 splits the display screen M. That is to say, when at least one of the touch positions P1 and P2 moves by a predetermined distance, the display screen M is split. As a modified example of the split timing 2, when a moving speed of at least one of the two touch positions P1 and P2 exceeds a predetermined threshold, the display splitting unit 23 can split the display screen M.

Figure 6:
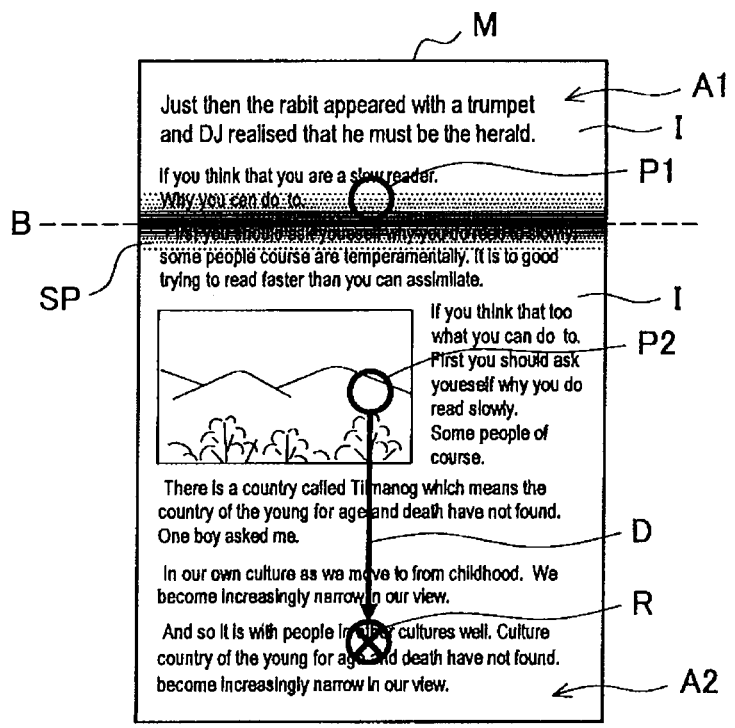
FIG. 6 is an explanatory diagram illustrating one example of display screen split timing in the display apparatus according to the first embodiment.

On the other hand, FIG. 6 illustrates an example of the split timing 3.

The example shown in FIG. 6 shows a case where the touch position P2 moves to the moving direction D and the touch of the display screen M is released at a separating position R. In this case, at the timing where the touch with the touch substance (for example, finger) is released, the display splitting unit 23 splits the display screen M. When this split timing 3 is used, the user can consciously control the split timing more easily than the other split timings.

One of the split timings 1 to 3 or one of their modified examples is desirably preset as the split timing by means of the display splitting unit 23.

(Display Image Before the Split)

The display control unit 10 desirably get a user to acknowledge that the display screen M is about to be split without discomfort until the touch positions P1 and P2 move and the display splitting unit 23 splits the display screen M at the split timing above. For this reason, the display control unit 10 desirably displays a display image to be split on the display screen M for a split transition period. The pinching-in operation and the pinching-out operation on the display image displayed by the display control unit 10 for the split transition period are described separately.

Figure 7A:
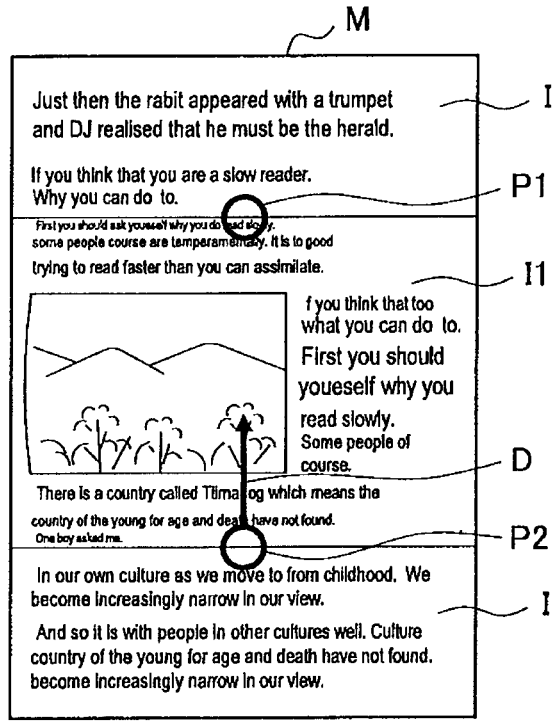
FIG. 7A is an explanatory diagram illustrating one example of a display image displayed for a split transition period by the display apparatus according to the first embodiment.

The case where the pinching-in operation is performed on the touch positions P1 and P2 is described. In this case, the relative distance between the at least two touch positions detected by the position detecting unit 20 becomes short. As a result, before the display splitting unit 23 splits the display screen M, the display control unit 10 displays a contracted image I1, which is obtained by contracting at least a part of the display image I (predetermined information) displayed on the display screen M, on at least a part of the display screen M as shown in FIG. 7A. At this time, a range on which the contracted image I1 is displayed is desirably between the touch positions P1 and P2. The contracted image I1 is set to a like image which is obtained by bending the display image I, thereby getting the user to acknowledge that at least a part of the display image I is contracted. On the contracted image I1 shown in FIG. 7A when the display image I is likened to paper, display contents are enlarged gradually from the touch positions P1 and P2 towards their middle position, so that an impression such that the paper is bent to the front of the display screen M can be given to the user. On the contrary, the display contents are contracted gradually from the touch positions P1 and P2 toward their middle position so that an impression such that the paper is bent to a back side of the display screen M can be given to the user.

When the contracted image I1 is displayed on at least a part of the display screen M for the split transition period, an impression such that the paper of the display image I is pinched and is bent with a narrowed pinching interval can be given to the user.

Figure 7B:
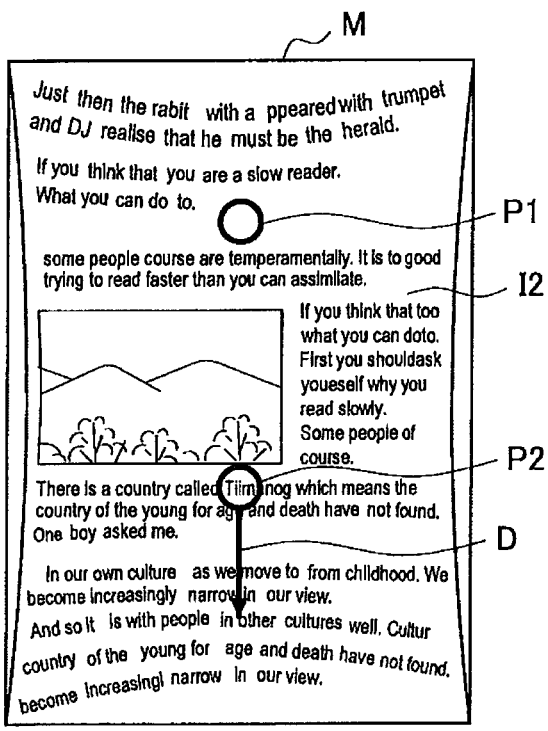
FIG. 7B is an explanatory diagram illustrating one example of a display image displayed for a split transition period by the display apparatus according to the first embodiment.

The case where the pinching-out operation is performed on the touch positions P1 and P2 is described below. In this case, the relative distance between the at least two touch positions detected by the position detecting unit 20 becomes long. As a result, before the display splitting unit 23 splits the display screen M, the display control unit 10 displays an enlarged image I2, which is obtained by enlarging at least a part of the display image I (predetermined information) displayed on the display screen M, on at least a part of the display screen M as shown in FIG. 7B. At this time, a range where the enlarged image I2 is displayed may be between the touch positions P1 and P2, but is desirably an entire area of the display screen M. The enlarged image I2 can get the user to acknowledge that at least a part of the display image I is contracted by setting the display image I to the image enlarged like rubber. On the enlarged image I2 shown in FIG. 7B, when the display image I is likened to paper, a width of the display image I (width in the direction of the border line B) is contracted at the center position of the display screen M and the display contents are also contracted, so that an impression such that the paper is enlarged like rubber can be given to the user.

The enlarged image I2 is displayed on at least a part of the display screen M for the split transition period, thereby giving an impression such that the paper of the display image I is pinched and the pinching interval is elongated so that the paper is ripped to the user.

The contracted image I1 and the enlarged image I2 described here are desirably displayed as moving images (animation) which are sequentially changed according to the movement of the touch position P1 or P2. It is desirable that the display control unit 10 displays the moving image (animation) on the divided display areas A1 and A2 at the split timing.

The display splitting unit 23 splits the display screen M into the plurality of display areas A1 and A2 through such an operation, but the direction and position of the border line B which determines the split direction can be changed after the split as described above. An example of the change in the direction and position of the border line B is described.

(Change in the Split Direction)

Figure 8A:
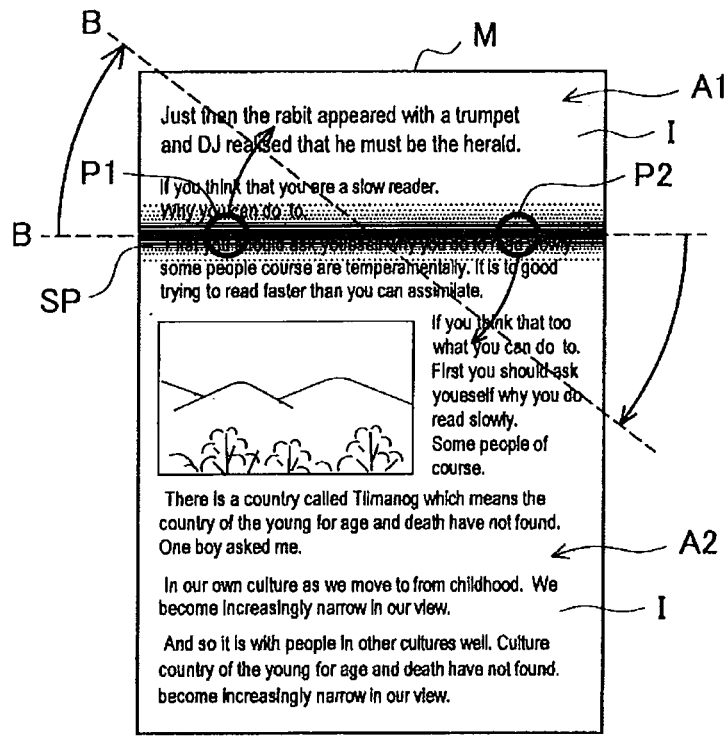
FIG. 8A is an explanatory diagram illustrating a change example of a split direction after split in the display apparatus according to the first embodiment.

After the display splitting unit 23 splits the display screen M, the direction of the border line B (namely, the splitter SP) is changed as shown in FIG. 8A when the position detecting unit 20 detects at least two touch positions on the boundary line B. That is to say, this case can represent that the border line B shown by the splitter SP is gripped by the touch positions P1 and P2 in a pseudo manner. When at least one of the touch positions P1 and P2 is moved, the split direction determining unit 21 rotates the direction of the border line B according to the movement. That is to say, in the example shown in FIG. 8A, the split direction determining unit 21 rotates the direction of the border line B so that the border line B is drawn through the moved touch positions P1 and P2, and the display control unit 10 moves the splitter SP onto the rotated border line B. When the split direction is changed in such a manner, an impression such that the touch positions P1 and P2 which grip the border line B are rotated, and the border line B rotates so as to follow the rotation of the touch positions P1 and P2 can be given to the user.

Figure 8B:
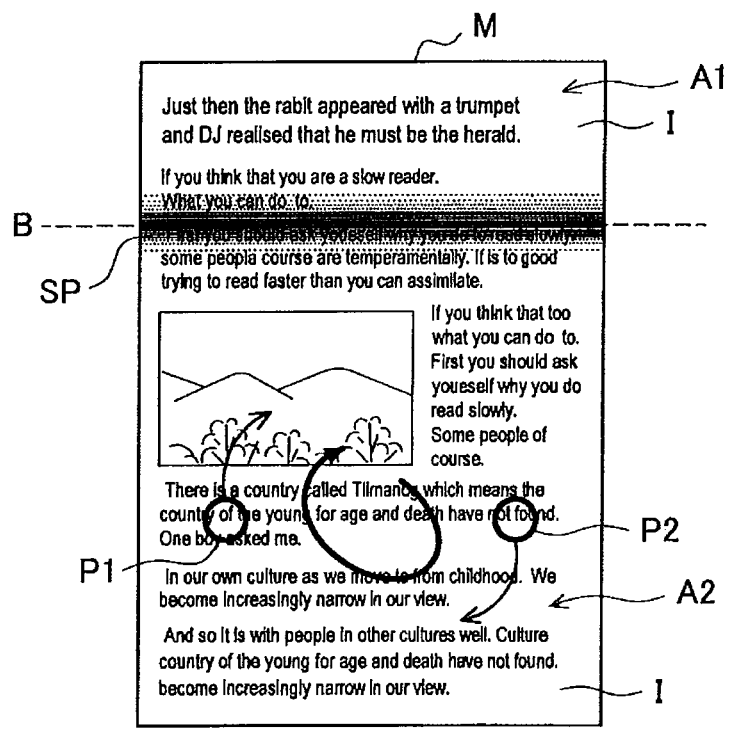
FIG. 8B is an explanatory diagram illustrating a rotation example of a display image after split in the display apparatus according to the first embodiment.

As shown in FIG. 8B, when the at least two touch positions P1 and P2 are detected not on the border line B but on any one of the display areas A1 and A2, the display control unit 10 desirably rotates the display image I according to the movement of at least one of the touch positions P1 and P2.

(Change in the Split Position)

Figure 9:
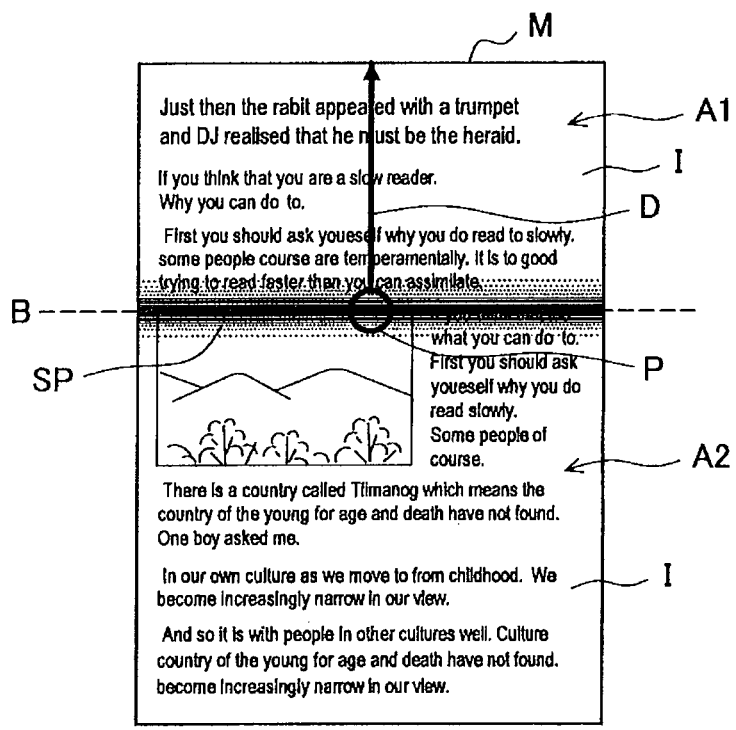
FIG. 9 is an explanatory diagram illustrating a change example of a split position after split in the display apparatus according to the first embodiment.

After the display splitting unit 23 splits the display screen M, as shown in FIG. 9, the position of the border line B (namely, the splitter SP) is changed when the position detecting unit 20 detects at least one touch position P on the border line B. That is to say, this case can represent that the border line B shown by the splitter SP is gripped by the touch position P in a pseudo manner. When at least one touch position P is moved, the split position determining unit 22 moves the position of the border line B so as to follow the movement of the touch position P. That is to say, in the example shown in FIG. 8B, the split position determining unit 22 moves the position of the border line B so that the border line B is drawn through the moved touch position P, and the display control unit 10 moves the splitter SP onto the moved border line B. When the split position is changed in such a manner, an impression such that the touch position P which grips the border line B is moved and the border line B moves so as to follow the movement of the touch position P can be given to the user.

When at least one touch position P is detected not on the border line B but on any one of the display areas A1 and A2, the display control unit 10 desirably slides the display image I according to the movement of at least one of the touch positions P.

The split of the display screen M is described above, but release of the split state by means of the display splitting unit 23, namely, combining of the split display areas A1 and A2 may be performed when the border line B (splitter SP) is moved to an end of the display screen M as shown in FIG. 9. Further, the combining of the display areas A1 and A2 may be performed when the touch position P is moved along a predetermined trajectory in such a manner that the touch position P moves along the border line B over the display areas A1 and A2, or when a predetermined action is taken in such a manner that the border line B is tapped.

[3-2. Operational Example of the Display Apparatus]

The constitutional example of the display apparatus 1 according to the first embodiment of the present invention is described above.

An operational example of the display apparatus 1 according to the first embodiment of the present invention is described below with reference to FIG. 10. The following describes a case where the split timing 1 is used as the split timing.

Figure 10:
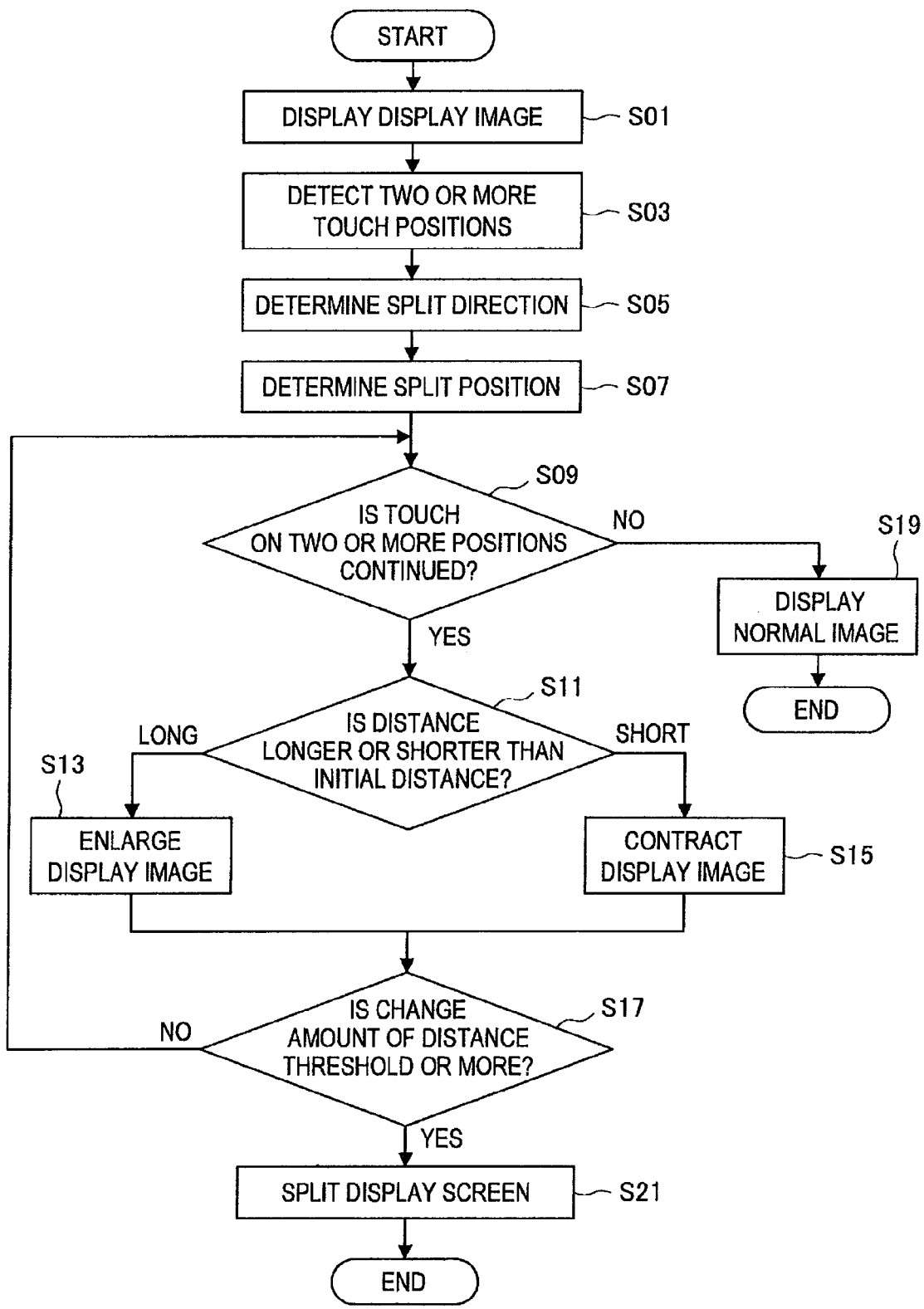
FIG. 10 is an explanatory diagram illustrating an operation of the display apparatus according to the first embodiment.

As shown in FIG. 10, step S01 (display control step) is executed, and the display control unit 10 displays the display image I including the predetermined information on the display screen M at step S01. The process goes to step S03.

The position detecting unit 20 detects two or more touch positions on the display screen M touched by the touch substance at step S03 (position detecting step). The process goes to step S05.

The split direction determining unit 21 determines the direction of the border line at the time of the split according to the two or more touch positions at step S05. At this time, any one of the direction determining methods 1 to 3 or any one of their modified examples may be used as the direction determining method. The process goes to step S07.

The split position determining unit 22 determines the position of the border line based on the two or more touch positions at step S07. At this time, any one of the position determining methods 1 to 4 or any one of their modified examples may be used as the position determining method. When the position determining method 3 is used, step S07 is desirably executed just before step S21. After step S07, the process goes to step S09.

The position detecting unit 20 checks if the two or more touch positions are detected at step S09. When the two or more touch positions are not continuously detected, the process goes to step S19, and when the two or more touch positions are continuously detected, the process goes to step S11.

At step S11, the display splitting unit 23 checks whether the distance between the touch positions becomes longer or shorter than an initial distance detected at step S03. When the distance becomes longer, the process goes to step S13, and the display control unit 10 displays the enlarged image I2 so as to enlarge the display image I at step S13. On the other hand, when the distance becomes shorter, the process goes to step S15, and the display control unit 10 displays the contracted image I1 so as to contract the display image I at step S15. Step 513 or step S15 is occasionally executed repeatedly in a loop of steps S09 to S17. In this case, every time when step S13 or S15 is repeated, the enlarged image I2 obtained by further enlarging the display image I is displayed at step S13, or the contracted image I1 obtained by further contracting the display image I is displayed at step S15. As a result, at step S13 or S15, animation in which the display image I is enlarged or contracted is desirably displayed. After step S13 or S15, the process goes to step S17. If the distance between the touch positions does not change at step S11, the process desirably goes from step S11 to step S09.

When step S13 or step S15 is executed and the process goes to step S17, the display splitting unit 23 checks if a change amount of the distance between the touch positions is a predetermined threshold or more. When the change amount is the threshold or more, the process goes to step S21, whereas the change amount is the threshold or less, the process after step S09 is repeated.

When the process after step S09 is repeated and a determination is made that the touch on the two or more positions is not continued at step S09 and the process goes to step S19, the display control unit 10 displays the normal display image I at step S19. That is to say, when step S13 or S15 is executed, the display image I is enlarged or contracted. However, when the touch on two or more positions is not continued, before the display screen M is split, the splitting operation is ended. In this case, therefore, the display control unit 10 returns the enlarged or contracted display image I to the normal display image I. When step S13 or S15 is not executed once, step S19 does not have to be provided. After the process at step S19, the splitting operation is ended.

On the other hand, when the change amount is threshold or more at step S17 and the process goes to step S21, the display splitting unit 23 splits the display screen M into two or more display areas A1 and A2 at step S21. At this time, the display control unit 10 desirably displays animation in which the display image I is split.

[3-3. Example of Effect of the Display Apparatus]

The constitution and the operation of the display apparatus 1 according to the first embodiment of the present invention are described above.

According to the display apparatus 1, a user touches the two or more touch positions P1 and P2 on the display screen M and at least any one of the touch positions P1 and P2 is only moved so that the display screen M can be split into the two or more display areas A1 and A2. Therefore, in the display apparatus 1, the display screen M can be split by the user's easy operation. When the display image I is likened to paper, such an operation corresponds to bending or enlarging the paper and matches with user's instinct. Therefore, the display apparatus 1 can dramatically improve the user's operability.

In the display apparatus 1, the position and direction of the border line at the time of the split can be suitably determined. Therefore, the display apparatus 1 can split the display screen M quickly in the user's desired position and direction.

It should be understood by those skilled in the art that various modifications, combinations, sub-combinations and alterations may occur depending on design requirements and other factors insofar as they are within the scope of the appended claims or the equivalents thereof.

For example, the above embodiment mainly describes the split of the display screen M when the position detecting unit 20 detects the two touch positions P1 and P2. However, the number of the touch positions is not limited to two. That is to say, when three or more touch positions are detected, the border lines B are set among the touch positions, and the display screen M can be split in three or more display areas. In this case, since the setting of the border lines B is similar to the case where the display screen M is split into the two display areas A1 and A2, detailed description thereof is omitted.

Figure 11:
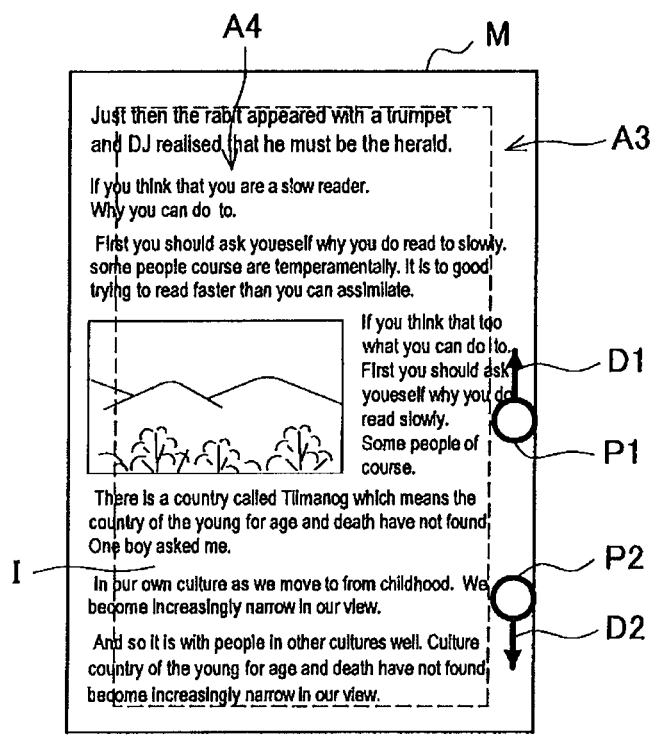
FIG. 11 is an explanatory diagram illustrating a change example of the display apparatus according to the first embodiment.

In the above embodiment, when the position detecting unit 20 detects the two touch positions P1 and P2 and at least one of the touch positions P1 and P2 is moved, the display screen M is split. However, the display apparatus according to the embodiments of the present invention can enlarge or contract the display image I according to the movement of the touch positions P1 and P2. A selection may be made from the split of the display screen M or change in the display magnification of the display image I based on the positions where the touch positions P1 and P2 are detected as shown in FIG. 11. That is to say, as shown in FIG. 11, the display screen M is split into a split area A3 and a magnification area A4 in advance. When the position where the touch positions P1 and P2 are detected is the split area A3, the display apparatus can perform the splitting operation, and when the magnification area A4, the display apparatus can perform a display magnification changing operation. Switching between the splitting operation and the display magnification changing operation may be carried out based on the number of the touch positions P1 and P2 to be moved or their moving direction. As shown in FIG. 11 for example, when both the two touch positions P1 and P2 are moved, the display apparatus performs the display magnification changing operation. When any one of the two touch positions P1 and P2 is moved as shown in FIGS. 4A to 4D, the display apparatus can perform the splitting operation. It goes without saying that the switching between the splitting operation and the display magnification changing operation has a lot of variations.

Figure 12:
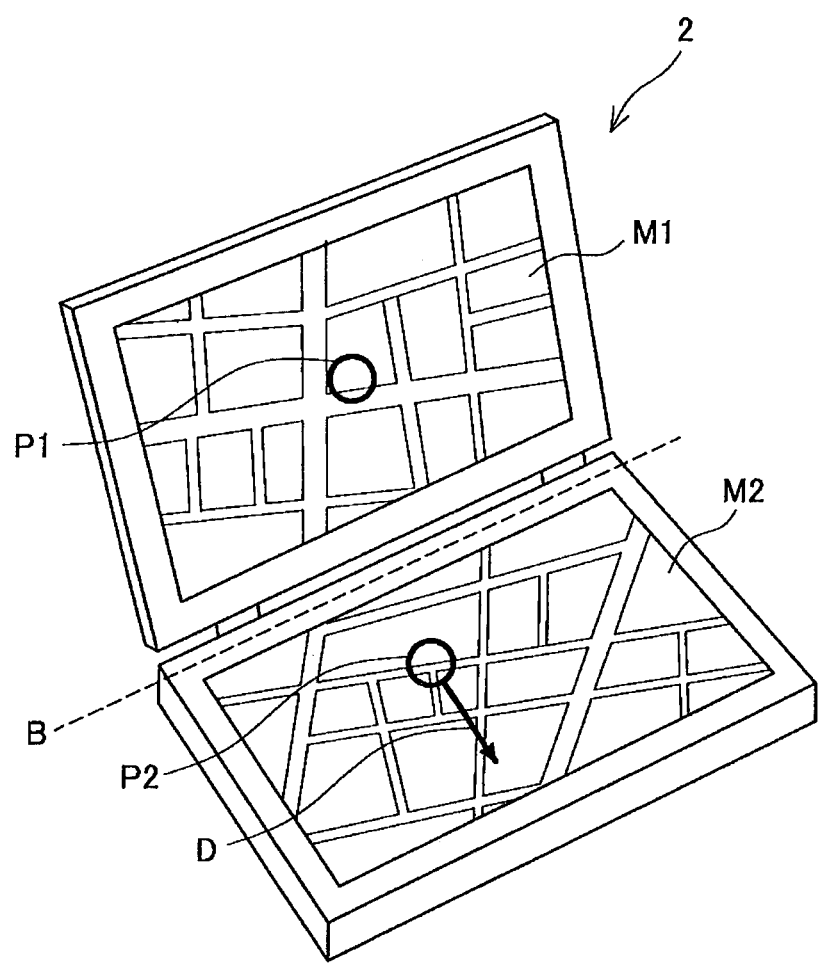
FIG. 12 is an explanatory diagram illustrating a change example of the display apparatus according to the first embodiment.

The above embodiment describes the case where the display apparatus 1 has one display screen M, but the number of display screens may be two or more. FIG. 12 illustrates a display apparatus 2 having two display screens M1 and M2. In this case, the two display screens M1 and M2 of the display apparatus 2 are treated as one display screen in a normal state. When the touch positions P1 and P2 are detected on the two display screens M1 and M2, the display apparatus 2 can individually split the display screens M1 and M2 into the display areas A1 and A2 similarly to the display apparatus 1 according to the first embodiment. In this case, the border line B may be set similarly to the display apparatus 1 according to the first embodiment, but may be set on a boundary between the display screens M1 and M2. When the border line B is set on the boundary between the display screens M1 and M2, the display apparatus 2 does not have to be provided with the split direction determining unit 21 and the split position determining unit 22. In this case, a sensor is additionally provided to the boundary between the display screens M1 and M2. When the sensor is pressed down, the split of the display screens M1 and M2 into the two display areas is released, so that the display screens M1 and M2 may be combined.

A series of the process described in the above embodiment may be executed by dedicated hardware, but may be executed by software. When a series of the process is executed by the software, a general-purpose or dedicated computer 900 shown in FIG. 13 is allowed to execute a program, so that the series of the process can be realized.

Figure 13:
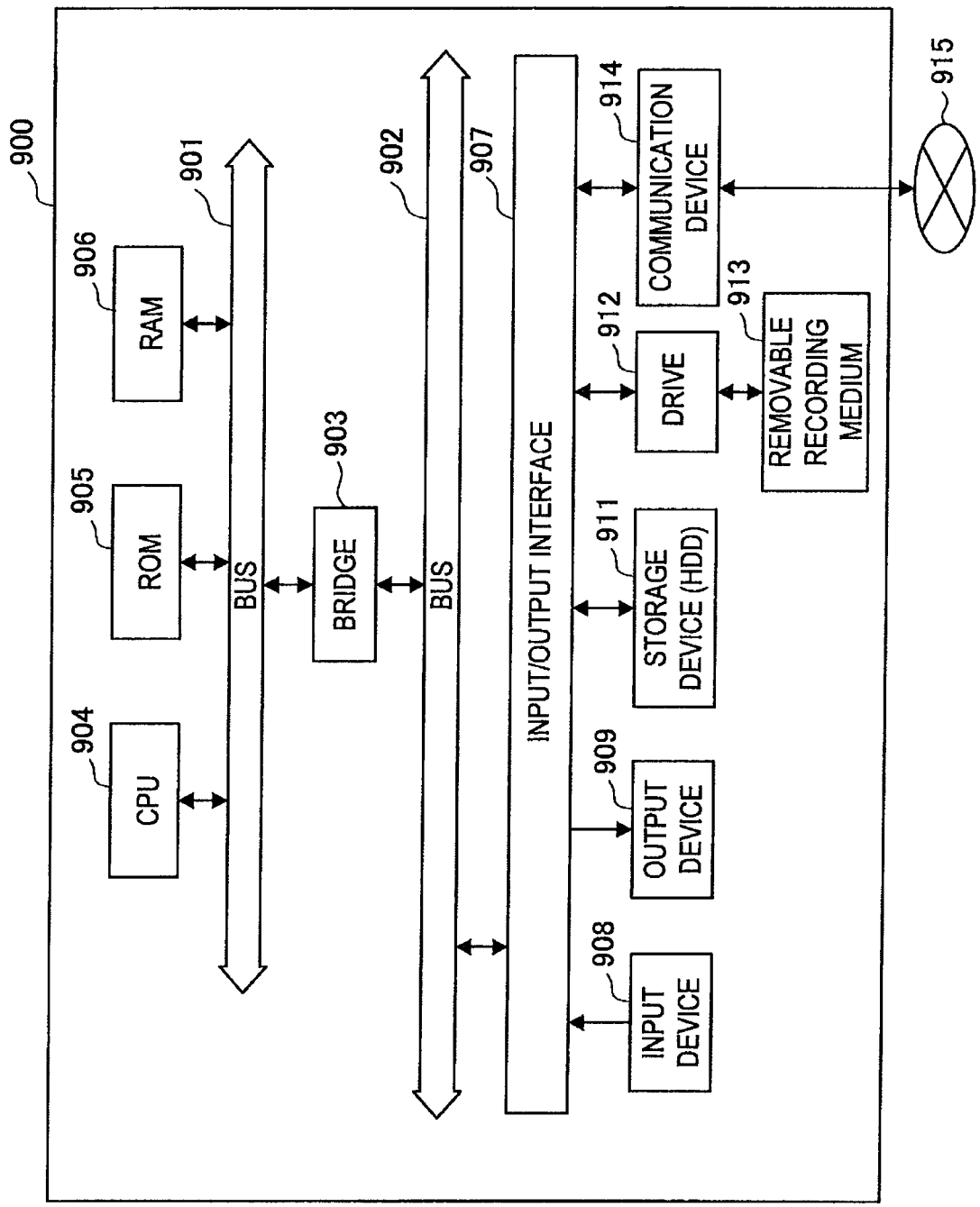
FIG. 13 is an explanatory diagram illustrating a constitutional example of a computer for realizing a series of process by means of execution of a program.

FIG. 13 is an explanatory diagram for describing a constitutional example of the computer 900 for realizing the series of the process by means of the execution of the program. The execution of the program for executing the series of processes by means of the computer 900 is described below.

As shown in FIG. 13, the computer has a bus 901, a bus 902, a bridge 903, a CPU (Central Processing Unit) 904, a recording apparatus, an input/output interface 907, an input device 908, an output device 909, a drive 912 and a communication device 914. These components are connected so as to be capable of transmitting information to each other via the bus 901, the bus 902 and the input/output interface 907 connected by the bridge 903.

The program can be recorded in a storage device 911 such as HDD (Hard Disc Drive) or SSD (Solid State Drive), a ROM (Read Only Memory) 905 or a RAM (Random Access Memory) 906 as one example of the recording apparatus.

Further, the program can be temporarily or permanently recorded in a magnetic disc such as a flexible disc, an optical disc such as CD (Compact Disc), MO (Magneto Optical) disc or DVD (Digital Versatile Disc), a removable storage medium 913 such as a semiconductor memory. Such a removable storage medium 913 can be provided as so-called package software. The program recorded in the removable storage medium 913 is read by the drive 912, and may be recorded in the above recording apparatus via the input/output interface 907 and the buses 901 and 902.

The program can be recorded in a download site, another computer or another recording apparatus (not shown). In this case, the program is transmitted via a network 915 such as LAN (Local Area Network) or internet, and a communication device 914 receives the program. The program received by the communication device 914 may be recorded in the above recording apparatus via the input/output interface 907, and the buses 901 and 902.

When the CPU 904 executes various processes according to the program recorded in the recording apparatus, the series of the process is realized. At this time, the CPU 904 may directly read the program from the recording apparatus so as to execute it, or may once load into the RAM 905 so as to execute it. When receiving the program via the communication device 914 or the drive 912, the CPU 904 may directly execute the received program without recording in the recording apparatus.

Further, the CPU 904 may execute various processes based on signals and information input from the input device 908 such as a mouse, a keyboard or a microphone (not shown) if necessary.

The CPU 904 may output a result of executing the series of the process from the display apparatus such as a monitor or the output device 909 such as a sound output device such as a speaker or a headphone. The CPU 904 may transmit the processed result from the communication device 914 if necessary, and may record the processed result in the recording apparatus or the removable storage medium 913.

In this specification, steps described in the flow chart are executed along the described flow in chronological order, or executed paratactically or individually instead of the execution in the chronological order. It goes without saying that as to even steps executed in chronological order, the order can be suitably changed in some cases.

The present application contains subject matter related to that disclosed in Japanese Priority Patent Application JP 2008-268582 filed in the Japan Patent Office on Oct. 17, 2008, the entire content of which is hereby incorporated by reference.

What is claimed is:

1. A display apparatus, comprising:
a display control unit configured to generate one or more instructions to display predetermined information on a display screen;
a position detecting unit configured to identify first and second touch positions associated with contact between a surface of the display screen and corresponding ones of a first touch substance and a second touch substance, the first touch substance contacting the surface of the display screen at the first touch position simultaneously with the second touch substance contacting the surface of the display screen at the second touch position; and
a display splitting unit configured to, upon detection of the first and second touch positions, generate an instruction to split the display screen into at least two display areas according to a relative movement between the first and second touch positions when the first touch substance is detected to be moved in relation to the second touch substance while both the first touch substance and the second touch substance maintain contact with the surface of the display screen,
wherein the two display areas are separated by a corresponding border line, the border line being substantially perpendicular to at least one of (i) a line connecting the first and second touch positions, and (ii) a direction of the movement.

2. The display apparatus according to claim 1, further comprising a split position determining unit configured to identify a position between the first and second touch positions as a position of the border line of the at least two display areas, the identification being based on at least the first and second touch positions.

3. The display apparatus according to claim 2, wherein the split position determining unit determines the position of the border line such that the border line is drawn through a middle point between the first and second touch positions prior to the movement.

4. The display apparatus according to claim 2, wherein the split position determining unit determines the position of the border line such that the border line is drawn through a middle point between the first and second touch positions subsequent to the movement.

5. The display apparatus according to claim 2, wherein upon movement of one of the first or second touch positions, the split position determining unit determines the position of the border line so that the border line is drawn proximate to the unmoved one of the first or second touch positions.

6. The display apparatus according to claim 2, wherein:
the position detecting unit is further configured to detect at least one additional touch position on the border line of the at least two display areas; and
the split position determining unit is configured to move the position of the border line so that the border Dine follows a movement of the at least one additional touch position.

7. The display apparatus according to claim 2, further comprising a split direction determining unit which determines an orientation of the border line of the at least two display areas within the display screen according to the at least the first and second touch positions.

8. The display apparatus according to claim 7, wherein the split direction determining unit determines an orientation of the border lines that is perpendicular to the line connecting the first and second touch positions e.

9. The display apparatus according to claim 7, wherein the split direction determining unit determines an orientation of the border lines that is perpendicular to the direction of the movement.

10. The display apparatus according to claim 7, wherein:
the position detecting unit is further configured to detect at least two additional touch positions on the border; and
the split direction determining is further configured to rotate the border line according to the movement of at least one of the additional touch positions.

11. The display apparatus according to claim 1, wherein when a relative distance between the first and second touch positions falls below a threshold value, the display control unit is further configured to generate an instruction to display an image obtained by enlarging at least a part of the predetermined information on the display screen.

12. The display apparatus according to claim 1, wherein when a relative distance between the first and second touch positions exceeds a threshold value, the display control unit is further configured to generate an instruction to display an image obtained by contracting at least a part of the predetermined information on the display screen.

13. A display method comprising the steps of:
generating one or more instructions to display predetermined information on a display screen;
identifying first and second positions associated with contact between a surface of the display screen and corresponding ones of a first touch substance and a second touch substance, the first touch substance contacting the surface of the display screen at the first touch position simultaneously with the second touch substance contacting the surface of the display screen at the second touch position; and
upon identification of the first and second touch positions, generating an instructions to split the display screen into at least two display areas according to a relative movement between the first and second touch positions when the first touch substance is detected to be moved in relation to the second touch substance while both the first touch substance and the second touch substance maintain contact with the surface of the display screen, wherein the two display areas are separated by a corresponding border line, the border line being substantially perpendicular to at least one of (i) a line connecting the first and second touch positions, and (ii) a direction of the movement.

14. A tangible, non-transitory computer-readable medium storing instructions that, when executed by at least one processor, cause the at least one processor to perform a method, comprising:

generating one or more instructions to display predetermined information on a display screen;

identifying first and second positions associated with contact between a surface of the display screen and corresponding ones of a first touch substance and a second touch substance, the first touch substance contacting the surface of the display screen at the first touch position simultaneously with the second touch substance contacting the surface of the display screen at the second touch position; and upon identification of the first and second touch positions, generating an instructions to split the display screen into at least two display areas according to a relative movement between the first and second touch positions when the first touch substance is detected to be moved in relation to the second touch substance while both the first touch substance and the second touch substance maintain contact with the surface of the display screen, wherein the two display areas are separated by a corresponding border line, the border line being substantially perpendicular to at least one of (i) a line connecting the first and second touch positions, and (ii) a direction of the movement.

15. The display apparatus of claim 1, wherein the display control unit is further configured to generate one or more additional instructions to display portions of the predetermined information within corresponding ones of the display areas.

16. The display apparatus of claim 1, wherein the position detecting unit is further configured to detect a loss of contact between the display screen surface and at least one of the first or second touch substances.

17. The display apparatus of claim 16, wherein the display splitting unit is further configured to generate the instruction to split the display screen upon detection of the loss of contact.

18. The display apparatus of claim 15, wherein each one of the display areas is independently scrolled or re-sized after the splitting of the display screen.

19. The display apparatus of claim 1, wherein when only one of the first touch substance and the second touch substance is moved while the other one of the first touch substance and the second touch substance remains substantially stationary and while both the first touch substance and the second touch substance maintain contact with the surface of the display screen, the display splitting unit generates the instruction to split the display screen.

20. The display apparatus of claim 19, wherein when both of the first touch substance and the second touch substance are moved while both the first touch substance and the second touch substance maintain contact with the surface of the display screen, an image currently displayed on the display screen is magnified according to the detected relative movement and the display splitting unit does not generate the instruction to split the display screen.

* * * * *